(12) United States Patent
Edwards

(10) Patent No.: US 6,996,839 B1
(45) Date of Patent: Feb. 7, 2006

(54) AUTHORIZED USER SYSTEM USING BIOLOGICAL SIGNATURE

(75) Inventor: Eric D. Edwards, San Francisco, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/561,753

(22) Filed: Apr. 29, 2000

(51) Int. Cl.
  *H04L 9/32* (2006.01)
(52) U.S. Cl. .......................... 726/5; 713/182; 713/186; 380/270; 709/219
(58) Field of Classification Search ............... 713/186, 713/182; 709/219, 220; 380/270; 726/5; 382/115
See application file for complete search history.

(56) References Cited

U.S. PATENT DOCUMENTS

| | | | |
|---|---|---|---|
| 5,371,671 A | 12/1994 | Andersen et al. ...... 364/413.01 |
| 5,598,536 A * | 1/1997 | Slaughter et al. ........... 709/219 |
| 5,963,908 A * | 10/1999 | Chadha ...................... 704/273 |
| 6,023,522 A | 2/2000 | Draganoff et al. .......... 382/124 |
| 6,193,153 B1 * | 2/2001 | Lambert ..................... 235/380 |
| 6,490,443 B1 * | 12/2002 | Freeny, Jr. .................. 455/406 |
| 6,581,161 B1 * | 6/2003 | Byford ....................... 713/182 |

OTHER PUBLICATIONS

60/152184 Communication and proximity authorization systems, Freeny, Jr.*

* cited by examiner

*Primary Examiner*—Emmanuel L. Moise
*Assistant Examiner*—Minh Dieu Nguyen
(74) *Attorney, Agent, or Firm*—Mikio Ishimaru

(57) ABSTRACT

An authorized user system for the Internet network is provided. The system includes biological signature circuitry for sensing a non-invasive biological signature from a user in contact with a biological identification device. Address circuitry in the biological identification device responds to the biological signature to provide a unique Internet Protocol address which can be provided to the Internet network to allow access thereto by a personal computer authorized by the authorized user.

19 Claims, 1 Drawing Sheet

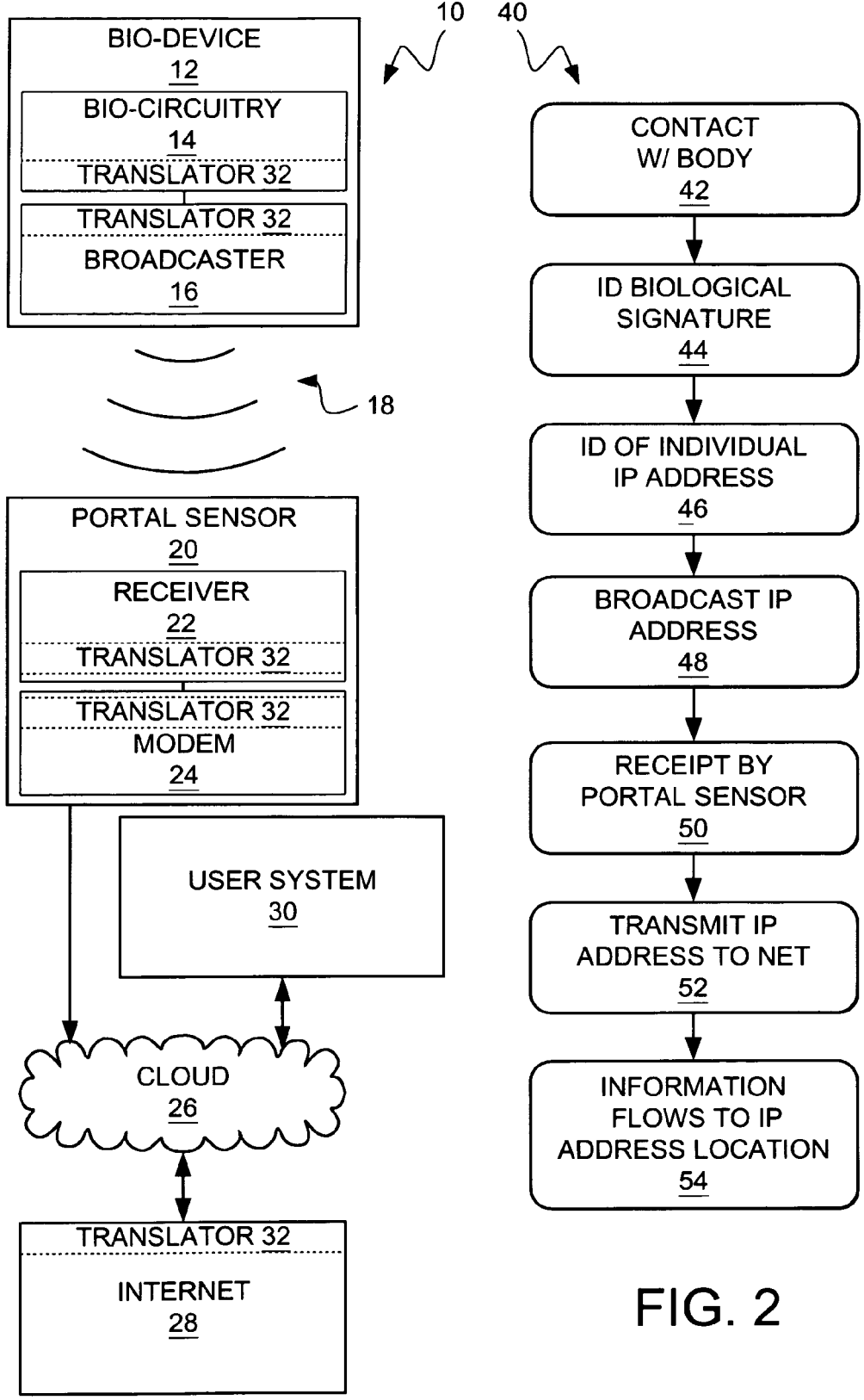

AUTHORIZED USER SYSTEM USING BIOLOGICAL SIGNATURE

TECHNICAL FIELD

The present invention relates generally to mechanisms for accessing computer networks and, more particularly, to a mechanism for uniquely identifying and authorizing individuals to access the Internet network.

BACKGROUND ART

Currently, a security-conscious user of a local area, wide area, or Internet network should have a password to turn on the user's personal computer, a password for each email account, a password for each type of network which is accessible, and numerous other passwords for individual files. If there are telephone access charges associated with accessing the network, different telephone numbers for credit card accounts and different passwords would be required for each credit card account. All the numbers and/or passwords must work together to allow access to the network for the user to send or receive information.

On the other end, the telecommunications carriers, web-content companies, and Internet service providers (ISPs) need to securely identify the user as the authorized user. Thus, passwords or personal identification numbers (PINs), collectively called personal identifiers, are almost universally used. The difficulty is that systems based on such personal identifiers are not very secure. Users who have large numbers of such personal identifiers often write them down in places where they can be found by others. Other users pick easily guessable words or number combinations which can be determined by unauthorized users, or hackers.

With the proliferation of various types of accounts, such as bank, telephone, credit, etc., and the places where the account information could be used, such as bank accounts for transfers, different telephone billing accounts, Internet stores, etc., the number of different personal identifiers required by a user has also proliferated to a tremendous extent. Because of the basic memory limitations of most users, it has also become increasingly difficult to maintain security of such personal identifiers.

DISCLOSURE OF THE INVENTION

The present invention provides an authorized user system for secure networks. The system includes biological identification circuitry for sensing a biological signature from a user connected to the circuitry. Address circuitry responds to the biological signature to provide a unique address which can be provided to the network to allow access thereto.

The present invention further provides an authorized user system for the Internet network. The system includes bio-logical identification circuitry for sensing a non-invasive biological signature from a user in contact with the circuitry. Address circuitry responds to the biological signature to provide a unique IP (Internet Protocol) address which can be provided to the Internet network to allow access thereto.

The present invention further provides a method of operation of an authorized user system for secure networks. The system includes biological identification circuitry for sensing a biological signature from a user connected to the circuitry. Address circuitry responds to the biological signature to provide a unique address which can be provided to the network to allow access thereto.

The present invention further provides a method of operation of an authorized user system for the Internet network. The system includes biological identification circuitry for sensing a non-invasive biological signature from a user in contact with the circuitry. Address circuitry responds to the biological signature to provide a unique IP address which can be provided to the Internet network to allow access thereto.

The above and additional advantages of the present invention will become apparent to those skilled in the art from a reading of the following detailed description when taken in conjunction with the accompanying drawings.

BRIEF DESCRIPTION OF THE DRAWINGS

FIG. 1 is a block diagram of the authorized user system of the present invention; and FIG. 2 is a flow chart of the operation of the authorized user system of the present invention.

BEST MODE FOR CARRYING OUT THE INVENTION

Referring now to FIG. 1, therein is shown an authorized user access system 10. The access system 10 includes a biological sensor device (bio-device) 12, which consists of biological identification circuitry (bio-circuitry) 14 and a broadcaster 16.

The broadcaster 16 is connected by broadcast signals 18 to a portal sensor 20, which includes a receiver 22 and a network interface 24. The bio-device 12 is physically separate from the portal sensor 20.

The network interface 24 is a modem or local area network connection and is connected through a telecommunications cloud 26 to an Internet network 28.

The Internet network 28 is connectable for bi-directional communications through the telecommunications cloud 26 to a user system 30 when an authorized user is identified by the bio-device 12. The bio-device 12 is physically separate from the user system 30.

The bio-device 12 contains the bio-circuitry 14 for identifying biological signatures such as DNA, fingerprint or iris patterns. Ideally, the biological signatures would be non-invasively obtained.

Various types of DNA pattern identification circuitry could be used. For fingerprint or iris patterns, various image acquisition devices use analog to digital converters which convert analog patterns into digital image grey scale data which can be read as line art output data for pattern identification purposes.

The broadcaster 16 is a conventional miniaturized radio frequency (RF) or infrared (IR) transmitter; however, it could also be a cable connection. The portal sensor 20 would be capable of receiving signals from the broadcaster 16 at the receiver 22 to be provided to the network interface 24. The network interface 24 would be connectable to a telecommunications cloud 26 which would consist of such systems as dedicated telephone lines or the plain old telephone systems (POTS).

An Internet network 28 would consist of conventional devices such as modems and computers (not shown) which would allow access to the Internet network 28 for the user system 30.

A translator 32 is provided to convert the biological signature into an Internet Protocol (IP) address which is used by the Internet to identify and connect the user system 30. The translator 32 could be in a number of locations as indicated in FIG. 1. For examples, the translator 32 could be in the bio-device 12 in the bio-circuitry 14 or an input to the broadcaster 16. The translator 32 could also be in the portal sensor 20 at the output of the receiver 22 or the input of the modem 24. In the alternative, the translator 32 could be in the Internet 28 although this would be less desireble because the biological signature would be a longer string of data than the IP address.

The translator 32 is a small processor containing a conversion algorithm or a lookup table for translating the biological signature, or characteristic portions thereof, into the IP address.

Referring now to FIG. 2, therein is shown a flow chart 40 of a preferred mode of the present invention. In the best mode, the bio-device 12 works only when the bio-circuitry 14 is in direct contact with a user for authentication purposes. The process starts with a step of bringing the bio-device 12 into contact with a user's body at a block 42. When contact is made, the bio-circuitry 14 identifies a biological signature, such as the DNA, at a block 44.

In the best mode, the user is identified by the user's unique biological signature which is immediately translated to identify an IP address at a block 46. The IP address then acts as a unique personal identifier of the user.

The IP address is then broadcast at a block 48 for receipt by a portal sensor at block 50. It should be noted that in some situations, it may be more convenient to use a contact connection such as a cable connection for the broadcast 48.

After receipt by the portal sensor at the block 50, the IP address is transmitted to the Internet at block 52. Bi-directional communication through the telecommunications cloud 26 and the Internet network 28 shown in FIG. 1 allows information to flow to the IP address location at a block 54 of the user system 30.

As previously indicated, the translation of the biological signature to the IP address may optionally be performed after receipt of the biological signature by the portal sensor in block 50 or after transmission of the biological signature to the Internet in block 52.

Ideally, the bio-device 12 would be miniaturized and contained in a ring, bracelet, tag, or other artifact which could be carried by or on the person for being placed in contact with the body for easy identification of the user in a way which is for the convenience of the user. Further, the biological signature should not be capable of being transmitted unless there is direct contact with the user in order to assure security.

Briefly reviewing the operation, the authorized user wanting to send an international email would place the bio-device 12 in appropriate contact on the user's body so the bio-circuitry 14 can determine the user's biological signature and provide the unique personal identifier as an IP address. The IP address would then be broadcast by the broadcaster 16 to the portal sensor 20. The portal sensor 20 can be any portal sensor at any location. Thus, the user can be using any computer, telephone, or access device at any location.

The portal sensor 20 receives the broadcast signal 18 at the receiver 22 and has the network interface 24 upload the IP address through a regular telephone line, or "skinny pipe" connection, to a local internet service provider (ISP).

At the ISP, a modem receives the telephone transmission and a computer checks the IP address. Since the ISP can be any ISP, the IP address can be used for billing purposes in addition to user identification.

Once the user is authorized, the ISP will connect the user system 30 through the telecommunications cloud 26 to the ISP's system. The user will enter the email. Then, the email is then sent to the ISP's mail sever which reads the recipient's address. The recipient's address could also be an IP address so the recipient would have the capability of receiving the email any place in the world.

The ISP's mail server checks the recipient's address with a first level local directory resident on an ISP computer for the location of the recipient's address. If the address is not located, the ISP computer queries a second level international computer which has directories for example for North America. If the address is still not located, a third level core directory computer is queried which contains all the addresses in the world. Once the recipient's address location is obtained, the ISP computer sends a header packet to the recipient's ISP computer and breaks the message into a number packets.

The header packet is the sent to a "gateway" router at the ISP which checks with the routers along the route to make sure the routers are ready for the packets. When ready, the packets are sent to a transmission center where a telephone company (a telco) switches the packets into an asynchronous transfer mode (ATM) for transcontinental transmission through "fat pipes", which are generally fiber optic cables. The telco in the receiving country restores the ATM signals into packets and a local router sends the packets along skinny pipes to the ISP computer. The ISP receives the header packet and other packets and converts it into Simple Mail Transfer Protocol (SMTP). The email in SMTP is then sent to the recipient personal computer and the email is downloaded if the recipient is the authorized recipient according to the recipient's IP address as indicated by the recipient's biological signature.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

What is claimed is:

1. A personal authorization system for a user system to access a network comprising:
    biological identification circuitry for sensing a biological signature from a user, the biological identification circuitry physically separate from the user system;
    a broadcaster connected to the biological identification circuitry and responsive thereto to provide a broadcast signal;
    a translator connected to the biological identification circuitry and the broadcaster for translating the biological signature for the broadcaster to provide the broadcast signal as a network address;
    a biological sensor device formed from the translator, the biological identification circuitry, and the broadcaster; and
    a receiver for receiving the broadcast signal and connecting the broadcast signal to the network, the receiver physically separate from the biological identification circuitry.

2. The system as claimed in claim 1 wherein the biological identification circuitry senses the biological signature only when the user is in direct contact therewith.

3. The system as claimed in claim 1 further comprising:
    a translator in the personal authorization system for translating the biological signature into a network address.

4. The system as claimed in claim 1 wherein the biological identification circuitry senses a biological signature selected from a group consisting of DNA, fingerprint, iris patterns, and combinations thereof.

5. The system as claimed in claim 1 including a portal system using a telecommunications cloud having a transmitter for transmitting the signature signal, the unique address information, or a combination thereof over the telecommunications cloud to the Internet.

6. The system as claimed in claim 1 wherein:
a translator for translating the broadcast signal into a network address, the translator disposed in the network; and
the network assigns the network address to the user system.

7. The system as claimed in claim 1 further comprising:
a telecommunications cloud connectable to the network;
a portal system having:
  a translator connected to the receiver for translating the broadcast signal into an network address and a transmitter for transmitting the network address to the network; and
wherein:
the user system accesses the telecommunications cloud for providing information to and from the network; and
the network includes a computer system for comparing the network address with an authorized address to authorize access of the user system to the network.

8. The system as claimed in claim 1 wherein:
the biological identification circuitry and the broadcaster are integral in a single biological sensor device selected from a group consisting of a ring, bracelet, tag, or a combination thereof.

9. The system as claimed in claim 1 wherein the biological identification circuitry senses a non-invasive biological signature selected from a group consisting of DNA, fingerprint, iris pattern, and combinations thereof.

10. A method for authorizing access to a user system for a network comprising:
sensing a biological signature from a user, the sensing performed physically separated from the user system;
broadcasting a broadcast signal in response to the sensing to a receiver from a broadcaster physically separated from the receiver;
transmitting the broadcast signal from the receiver to a network;
a translator connected to the biological identification circuitry and the broadcaster for translating the biological signature for the broadcaster to provide the broadcast signal as a network address;
a biological sensor device formed from the transistor, the biological identification circuitry, and the broadcaster; and
comparing the broadcast signal with an authorized signal to allow the user system to access the network.

11. The method as claimed in claim 10 wherein the step of: sensing a biological signature senses a biological signature selected from a group consisting of DNA, fingerprint, iris patterns, and combinations thereof.

12. The method as claimed in claim 10 including the steps of:
receiving the broadcasting of the broadcast signal proximate the user system; and
transmitting the broadcast signal to the network from proximate the user system.

13. The method as claimed in claim 10 including the steps of:
receiving the broadcasting of the broadcast signal proximate the user system;
transmitting the broadcast signal to the network from proximate the user system;
receiving the broadcast signal in a telecommunications cloud; and
providing the broadcast signal to the network.

14. The method as claimed in claim 10 including the steps of:
receiving the broadcasting of the broadcast signal proximate the user system; and
transmitting the broadcast signal to the network from proximate the user system;
receiving the broadcast signal from a telecommunications cloud;
providing the broadcast signal to the network;
accessing the telecommunications cloud with the user system for providing information to and from the network; and
comparing the broadcast signal with an authorized signal to authorize access of the user system to the network.

15. A method for authorizing access to a user system for an Internet network comprising:
sensing a biological signature from a user, the sensing performed in biological identification circuitry physically separated from the user system;
responding to the biological signature to provide an Internet Protocol address information;
broadcasting the Internet Protocol address information to a receiver from a broadcaster physically separated from the receiver;
transmitting the Internet Protocol address information from the receiver to the Internet network;
translating the biological signature in a translator for the broadcaster to provide a broadcast signal as a network address;
forming a biological sensor device from the translator, the biological identification circuitry, and the broadcaster; and
comparing the Internet Protocol address information with an authorized Internet Protocol address information to allow the user system to access the Internet network.

16. The method as claimed in claim 15 wherein the step of sensing a biological signature is selected from a group consisting of DNA, fingerprint, iris patterns, and combinations thereof sensed non-invasively.

17. The method as claimed in claim 15 including the steps of:
receiving the broadcasting of the Internet Protocol address information proximate the user system; and
transmitting the Internet Protocol address information to the Internet network from proximate the user system.

18. The method as claimed in claim 15 including the step of:
receiving the broadcasting of the Internet Protocol address information proximate the user system;
transmitting the Internet Protocol address information from proximate the user system;
receiving the Internet Protocol address information in a telecommunications cloud; and
providing the Internet Protocol address information to the Internet network.

19. The method as claimed in claim 15 including the steps of:
receiving the broadcasting of the Internet Protocol address information;

transmitting the Internet Protocol address information in a telecommunications cloud;
providing the Internet Protocol address information to the Internet network;
accessing the telecommunications cloud with an access device for providing information to and from the network;

comparing the Internet Protocol address information with authorized address information to authorize access of the access device to the Internet network; and
assigning the Internet Protocol address information to the user system.

* * * * *

UNITED STATES PATENT AND TRADEMARK OFFICE
CERTIFICATE OF CORRECTION

PATENT NO. : 6,996,839 B1 Page 1 of 1
DATED : February 7, 2006
INVENTOR(S) : Edwards It is certified that error appears in the above-identified patent and that said Letters Patent is hereby corrected as shown below:

Column 5,
Line 51, delete "transistor" and insert -- translator --.

Signed and Sealed this

Fourth Day of April, 2006

JON W. DUDAS
*Director of the United States Patent and Trademark Office*